UNITED STATES PATENT OFFICE.

FELIX VISINTAINER, OF GLACIER, WASHINGTON, ASSIGNOR OF ONE-FOURTH TO WILLIAM LEMM, OF BELLINGHAM, WASHINGTON.

METHOD OF TREATING IRON AND STEEL.

1,381,771. Specification of Letters Patent. Patented June 14, 1921.

No Drawing. Application filed September 18, 1920. Serial No. 411,162.

*To all whom it may concern:*

Be it known that I, FELIX VISINTAINER, a citizen of the United States, residing at Glacier, in the county of Whatcom and State of Washington, have invented a new and useful Method of Treating Iron and Steel, of which the following is a specification.

This invention relates to the method of making cast iron from pig iron and scrap iron castings, steel castings from mild steel, cast steel from steel, the tempering of steel and the like.

My process depends for its effectiveness on the use of a decomposed, mineralized rock of the consistency of hard clay which occurs in a ledge of solid formation near Excelsior, in the township of Glacier, county of Whatcom and State of Washington. To this ore I have given the name of lemnite. By analysis it has been found to contain the following in proportions as stated: silica 61.12%, ferric oxid 7.92%, alumina 16.06%, calcium oxid 6.39%, magnesium 3.46%, sulfur 0.86%, alkali 0.53%, and moisture 3.66%. Analyses also have shown it to contain gold and silver in appreciable quantities. But since the occurrence of these precious metals appears to be irregular, and since their presence or absence is believed not to affect the results obtained when used for the purpose intended, I desire to be understood as not depending on their presence in the material for the results obtained.

In my process this mineralized clay is used as a flux and alloy as hereinafter more particularly described.

In making cast iron from pig iron and scrap cast iron each piece is coated with a viscous flux made by mixing powdered lemnite with water. These coated pieces are placed in the furnace with fuel in the usual manner and also quantities of lemnite in the form of small lumps are mixed in with the pieces of metal. The metal is then subjected to heat and melted in the usual way, drawn off and poured in molds as usual. In all cases the noticeable effect is to produce iron castings of closer grain, harder and tougher than if lemnite had not been used.

In making steel castings from mild steel substantially the same method is employed as above described for cast iron. In this manner steel castings are made that are closer grained, tougher, stronger, and more malleable than those made as usual; and less difficulty will be found in producing good steel castings when lemnite is used than ordinary.

In making cast steel from malleable steel a substantially similar process is employed to that above described for cast iron, and the result obtained is very different than if the steel were melted in the absence of lemnite. Now the cast steel is not brittle, but tough, malleable and susceptible of taking a temper.

In tempering tool steel the part to be tempered is coated with lemnite flux, heated to the desired temperature forged in the desired shape, recoated with lemnite flux before each reheating, heated to the desired temperature for tempering and then tempered in any of the usual ways. Then the tempered part will be found harder and tougher than when done without using lemnite.

Good results also can be obtained by using lemnite as a flux when employing other methods of melting or heating than those mentioned above. In all cases the coating of lemnite acts to protect the hot metal from contact with oxygen and loss thereby.

I do not desire to be understood as limiting myself to the use of the natural mixture of metals and earths occurring in lemnite, but also desire to reserve for myself the use of artificial combinations and mixtures of the above ingredients which constitute the said lemnite, and which are found to be effective in producing the results stated.

Having thus fully disclosed my invention, what I claim is new and desire to secure by Letters Patent is,—

1. In the treatment of iron and steel, the process of coating the metal with a mineralized clay substantially comprising silica 61.12%, ferric oxid 7.92%, alumina 16.06%, calcium oxid 6.39%, magnesium 3.46%, sulfur 0.86%, alkali 0.53%, and moisture 3.66% mixed with water to the consistency of paste, raising it to the required temperature for the purpose desired and shaping it into the desired form.

2. In the treatment of iron and steel, the process of coating the metal with a mineralized clay substantially comprising silica 61.12%, ferric oxid 7.92%, alumina 16.06%, calcium oxid 6.39%, magnesium 3.46%, sulfur 0.86%, alkali 0.53%, and moisture 3.66% mixed with water to the consistency of paste. raising it to the required temperature for the object intended in the presence of other mineralized clay substantially comprising silica 61.12%, ferric oxid 7.92%, alumina 16.06%, calcium oxid 6.39%, magnesium 3.46%, sulfur 0.86%, alkali 0.53%, and moisture 3.60% mixed with water to the consistency of paste and forming it into the desired shape.

3. In the treatment of iron and steel, the process of coating the metal with a mineralized clay substantially comprising silica 61.12%, ferric oxid 7.92%, alumina 16.06%, calcium oxid 6.39%, magnesium 3.46%, sulfur 0.86%, alkali 0.53%, and moisture 3.66% mixed with water to the consistency of paste. raising it to the desired temperature and cooling it as rapidly as required for the purpose desired.

FELIX VISINTAINER.